United States Patent [19]
Hagen et al.

[11] Patent Number: 6,013,756
[45] Date of Patent: Jan. 11, 2000

[54] PROCESS FOR PRODUCING POLYESTERS USING TITANIUM-CONTAINING CATALYST-INHIBITOR COMBINATIONS

[75] Inventors: Rainer Hagen, Berlin; Eckehart Schaaf, Teltow; Heinz Zimmermann, Kleinmachnow, all of Germany

[73] Assignee: Karl Fischer Industrieanlagen GmbH, Berlin, Germany

[21] Appl. No.: 08/973,042

[22] PCT Filed: May 22, 1996

[86] PCT No.: PCT/DE96/00932

§ 371 Date: Feb. 12, 1998

§ 102(e) Date: Feb. 12, 1998

[87] PCT Pub. No.: WO96/37534

PCT Pub. Date: Nov. 28, 1996

[30] Foreign Application Priority Data

May 23, 1995 [DE] Germany .......................... 195 18 943

[51] Int. Cl.[7] .................................................. C08G 63/00
[52] U.S. Cl. .......................... 528/279; 528/271; 528/272; 528/280
[58] Field of Search .................................. 528/271, 272, 528/279, 280

[56] References Cited

U.S. PATENT DOCUMENTS 5,744,571 4/1998 Hilbert et al. .......................... 528/272

FOREIGN PATENT DOCUMENTS

| 24 34 213 | 2/1975 | Germany . |
| 26 26 827 | 7/1988 | Germany . |
| 54-120699 | 9/1979 | Japan . |
| 55-38838 | 3/1980 | Japan . |
| 55-80428 | 6/1980 | Japan . |
| 588833 | 6/1947 | United Kingdom . |
| 769220 | 3/1957 | United Kingdom . |

OTHER PUBLICATIONS

H. Ludewig—Polyesterfasern; Akademie–Verlag Berlin 1997; pp. 113–121.

*Primary Examiner*—Terressa Mosley-Boykin
*Attorney, Agent, or Firm*—Marshall & Melhorn

[57] ABSTRACT

The invention relates to a process for producing polyesters, especially high-molecular polyethylene terephthalate (PET) using titanium-containing catalyst-inhibitor combinations.

23 Claims, No Drawings

PROCESS FOR PRODUCING POLYESTERS USING TITANIUM-CONTAINING CATALYST-INHIBITOR COMBINATIONS

The invention relates to a method of manufacturing polyethylene terephthalate and mixed polyesters from terephthalic acid and ethylene glycol and other multi-functional alcohols and multi-basic carboxylic acids, using titanium catalysts, cobalt compounds and phosphorus-containing compounds as inhibitors.

The industrial production of polyethylene terephthalate and its mixed polyesters is normally carried out in two stages. In the first stage the multi-basic carboxylic acids, e.g. terephthalic acid or their alkyl esters are converted with ethylene glycol or a mixture of various multi-functional alcohols to form a low-molecular precondensate which in a second stage is polycondensed to form high-molecular polyethylene terephthalate or a corresponding copolyester. In order to achieve industrially practical conversion times and polyesters with a high molecular weight and a good product quality, both stages of the polyester manufacture require catalytic acceleration. Esterification of the terephthalic acids with ethylene glycol is already catalysed by the protons released from the tertephthalic acid and can be accelerated by specific compounds or can be influenced in its progress, e.g. with regard to the formation of by-products such as diethylene glycol. In order to accelerate the re-esterification and polycondensation, special catalysts must be used. Numerous compounds have been proposed as re-esterification and polycondensation catalysts. Preferably used are metal compounds which are described for example in H. Ludewig "Polyesterfasern" (Akademie-Verlag Berlin 1975).

Catalysts for polyester manufacture however not only catalyse the build-up reaction but to a differing degree accelerate breakdown reactions, heat resistance, the formation of by-products, the colour and the processing behaviour of the end product. In order to improve the production procedure and the product qualities, therefore, catalysts and catalyst combinations co-ordinated with the respective purpose, and catalyst inhibitors and stabilisers are used. Salts of organic acids with bivalent metals (e.g. manganese, zinc, cobalt or calcium acetate) are preferably used as re-esterification catalysts, which in themselves also catalyse the polycondensation reaction. Due to their catalytic action on breakdown reactions of the PET, the metal catalysts must be rendered inactive before the start of polycondensation by conversion with specific catalysts inhibitors. Phosphorus-containing compounds, such as phosphorous acids or phosphoric acids and their esters, are mainly used as inhibitors. Antimony, germanium and titanium compounds are preferably used as polycondensate catalysts. Antimony compounds have become widely used in the manufacture of PET for various fields of application, as they catalyse the polycondensation reaction relatively well and provide little stimulus for breakdown reactions and the formation of by-products. Disadvantages in the use of antimony compounds reside in their toxicity and a grey coloration of the polycondensate which is always observed, due to elementary antimony. The toxicity of the antimony compounds, especially of the antimony trioxide, which is preferably used as a polycondensation catalyst, has a disadvantageous effect on the one hand in the manufacturing process when starting and handling the catalyst solutions, and on the other hand in processing, use and disposal of the end products, leading to environmental pollution, as the antimony is partly washed out by water and passes into the waste water, or pollutes the air when the polyesters are burned.

In electrical and electronic components of PET, which remain at high temperatures for long periods, antimony tends to migrate and form coatings on the surface, which can lead to contact problems.

The colour tone of germanium-containing polyesters is indeed brighter than that of products containing antimony, yet germanium favours the formation of by-products, particularly diethylene glycol, and the thermal oxidative breakdown is catalysed.

In the first stage of polyester manufacture, titanium compounds catalyse both the re-esterification and the esterification, and lead to a clear increase in polycondensation speed, yet the polycondensates have a pronounced yellow coloration.

It is known from GB PS 588 833 and 769 220 that trivalent and pentavalent phosphorus compounds can be used as inhibitors against the discoloration of polyesters. In DE PS 26 26 827, metallic phosphoric acid is proposed as a stabiliser for titanium-containing polyesters. It is shown in DE OS 24 34 213 that the discoloration of titanium-containing polyesters can be successfully suppressed by the addition of phosphoric acid or phosphate esters. On the other hand, the addition of phosphoric acid and phosphate esters also leads to inhibition of the catalytic activity of the titanium during polycondensation of the polyester. It is therefore proposed in DE OS 24 34 213 to carry out esterification of the terephthalic acid with ethylene glycol in the presence of titanium compound soluble in the reaction mixture, to de-activate the titanium compound after termination of esterification by conversion with phosphoric acid or a phosphate ester, and to accelerate the following polycondensation by adding a soluble antimony or germanium compound. This however again leads to the known disadvantages in the use of antimony and germanium compounds.

The object underlying the present invention is therefore to eliminate environmental pollution due to the release of antimony by replacing the antimony trioxide as a polycondensation catalyst during polyester synthesis by using non-toxic catalysts, and to produce brightly-coloured polyesters with a low content of by-products and acetaldehyde with high thermal and thermoxidative resistance. At the same time, the polyesters are to have a particularly low content of metal compounds.

This purpose is achieved in terms of method by the characterising features of claim 1, and with reference to the polyesters by the features of claim 6. The secondary claims reveal advantageous further developments.

According to the invention the method of manufacturing polyesters and copolyesters from the conversion of a least one dicarboxylic acid, e.g. terephthalic acid, which can be partly replaced by other dicarboxylic acids or higher-value polycarboxylic acids, with at least one alkane diol, e.g. ethylene glycol, can also contain other bivalent and multi-valent alkane polyols, in the presence of a titanium-containing catalyst such as titanium tetrabutylate in a quantity of 0.005 to 0.05 mmol/mol dicarboxylic acid and subsequent addition of a phosphorus-containing inhibitor in a quantity of 0.004 to 0.4 mmol phosphorus/mol polycarboxylic acid. By means of addition of the phosphorus compound, especially according to the invention phosphoric acid, phosphorous acid, phosphonic acid and their esters, the catalytic activity of the titanium is partly inhibited, as shown in DE OS 24 34 213. Surprisingly, however, it was discovered that the catalytic activity of the titanium as a polycondensation catalyst is retained or re-established if, simultaneously with or after addition of the phosphorous-containing inhibitor, a cobalt salt such as cobalt acetate is added in a quantity of 0.5 to 5 mol cobalt/mol phosphorus, preferably 0.7 to 2 mol/mol, and that in this way brightly coloured polyesters with a low content of by-products and a low reformation rate of acetaldehyde are obtained.

Catalyst-inhibitor combinations on the basis of cobalt, titanium of phosphorus compounds to this extent belong to known prior art, in that cobalt compounds are used as a catalyst for re-esterification of terephthalic acid dimethyl ester with ethylene glycol, are subsequently inhibited by the addition of phosphorus compounds, and the polycondensation is carried out in the presence of known polycondensation catalysts such as antimony, titanium or germanium. Such combinations are for example described in U.S. Pat. No. 3,907,754. In the present case however what is involved is the manufacture of a polyester precondensate by esterification of terephthalic acid or of a mixture of terephthalic acid with other di- and polycarboxylic acids, and ethylene glycol, which can also contain other alkane diols or higher-value polyols, in which cobalt compounds are not catalytically active, and are transferred by conversion with the terephthalic acid present in the excess into poorly soluble cobalt terephthalate.

Another surprising factor is that titanium concentrations of e.g. 0.02 mmol titanium/mol dicarboxylic acid have a catalytic activity which is comparable with that of roughly 0.3 mmol antimony/mol dicarboxylic acid, a concentration which is conventional in large-scale industrial manufacture of PET. Thus the dosage of catalyst can be reduced to about a fortieth part (with respect to the mass of the metals).

The invention opens the way to polyesters with a particularly low content of heavy metals. Apart from the fact that a low catalyst consumption entails cost advantages in the manufacture of polyester, low metal ion concentrations are also of importance for the properties of electrical and electronic components manufactured from these polyesters. Low concentrations of metal ions reduce the dielectric constant, increase the electrical dielectric strength and the specific forward resistance, and thus extend the possibilities of use of the polyesters in the field of electrotechnology and electronics.

The low content of heavy metals leads to a higher oxidation stabliity of the polymer in comparison to polymers produced with about 0.3 mmol antimony/mol dicarboxylic acid. This relates in particular to the manufacture of rapidly-crystallising polyethylene terephthalate, where the crystallisation accelerators added increase the oxidative damage. Such rapid-crystallising products can be produced for example also from dimethyl terephthalate (DMT), if the re-esterification is catalysed by the addition for example of 0.2 mm titanium tetrabutylate/mol DMT in conjunction with 6 to 10 mmol sodium acetate/mol DMT and 0.01 to 0.02 mmol cobalt acetate/mol DMT, and the following polycondensation is likewise carried out in the presence of these additives.

According to the invention, the esterification is carried out in the presence of a titanium compound up to a conversion of over 95%, preferably over 98%, measured by the degree of dehydration, at temperatures of up to 270° C. at a slight excess pressure of up to about 3 bar absolute, or at normal pressure. The phosphorus-containing inhibitor is added in the form of alcoholic solution or suspension, or in another appropriate form before, during or after esterification, and is homogeneously mixed. After termination of esterification and after addition of the inhibitor, a cobalt compound, e.g. cobalt acetate dissolved in ethylene glycol, is mixed into the melt, and polycondensation is carried out in a known way with a pressure dropping gradually to about 1 mbar, to an intrinsic viscosity of 0.6 dl/g. The cobalt compound may also be added after a further completion of esterification, after the elimination of glycol or after the beginning of prepolycondensation. In order further to increase the intrinsic viscosity, the polyester produced according to the invention can be subjected in a known way to a solid-phase post-condensation.

The invention will be described in more detail with reference to examples:

1. EXAMPLE 1

690 g terephthalic acid (TPA) are esterified with 3190 g ethylene glycol, adding 0.02 mmol titanium tetrabutylate/mol TPA at temperatures of 250° C. rising as far as 270° C. and at a pressure of 1 bar. The water occurring is distilled off until the theoretical quantity is obtained.

The esterification product is mixed according to the invention with the stabilisers indicated in Table 1 and with cobalt acetate, and polycondensed under a gradually increasing vacuum at 280° C. for 150 minutes. The polyesters are identified by determining the intrinsic viscosity (IV) in phenol/1,2-dichlorbenzol (1:1) at 20° C., the carboxyl terminal group content and by the colour values of the CIE-L/a/b-system, positive b-values showing a yellow coloration, negative b-values a blue coloration.

Table

Polycondensation of the esterification product with a content of 0.02 mmol titanium tetrabutylate/mol terephthalic acid, adding various stabilisers and cobalt acetate, polycondensation time 150 minutes at 280° C., final vacuum 0.1 mbar.

| No. | Stabiliser (mmol/mol TPA) | Cobalt (mmol/mol TPA) | IV (dl/g) | COOH (mmol /kg) | Colour (CIE L/a/b) b value |
|---|---|---|---|---|---|
| 1.3 | 0.1 TNPP | 0.1 | 0.66 | 16.1 | 5.8 |
| 1.4 | 0.1 $H_3PO_4$ | 0.1 | 0.65 | 13.0 | 5.0 |
| 1.5 | 0.1 BPDP | 0.1 | 0.73 | 22.1 | 5.6 |
| 1.6 | 0.1 Poly-PPS | 0.1 | | | 5.4 |
| 1.7 | 0.1 TPPat | 0.1 | 0.68 | 25.5 | 6.3 |

TNPP: Trisnonylphenylphosphite
$H_3PO_4$: 85% Phosphoric acid
BPDP: Bis (2,4-di-tert-butylphenyl)-pentaerythrite diphosphite
Poly-PPS: Polyphosphoric acid
TPPat: Triphenylphosphate

2. COMPARATIVE EXAMPLE 2.1 An esterification product is produced as in Example 1 in the presence of 0.02 mmol titanium tetrabutylate/mol TPA and polycondensed without further additives for 150 minutes as in Example 1. The polyester obtained has a IV of 0.69 dl/g and with a b-value of 9.6 has a pronounced yellow coloration.

2.2 An esterification product as in Example 1 and 2.1, containing 0.02 mmol titanium tetrabutylate/mol TPA, is mixed with 0.1 mmol trisnonylphenyl phosphite/mol TPA and polycondensed as in Example 1. After a polycondensation time of 150 minutes, an intrinsic viscosity of 0.55 dl/g was reached.

3 EXAMPLE FOR A CONTINUOUS PROCESS

Terephthalic acid (TPA) and ethylene glycol (EG) are mixed in a paste mixer with a mol ratio 1:1.18, adding 0.02 mmol titanium tetrabutylate/mol TPA, fed continuously into a first esterification reactor and intensively mixed with the monomer melt provided at that point. At a pressure of 2.5 bar (absolute) and a temperature of 260° C., the TPA is esterified with EG. The reaction water is removed via a distillation column, and the EG partly evaporated therewith is returned into the monomer melt. The melt passes into a second reactor, which is sub-divided into three stages, the temperature is increased in stages to 270° C. In the first stage 0.07 mol polyphosphoric acid/mol TPA (calculated on the phosphorus content) is mixed in as a solution in EG. Excess EG evaporates off and leaves the reactor as vapour. At a polycondensation degree of the melt of 4 to 5 and a concentration of the carboxyl terminal groups of less than 150 mmol/kg, a solution of cobalt acetate in EG is fed in and mixed, in the third stage of the reactor. The solution is so dosed that the melt contains 0.1 mmol cobalt per mol TPA. After leaving the second reactor, the melt flows into a third reactor, where at 20 mbar and about 275° C., further EG is driven off and the polycondensation continues. In the following final reactor, of the horizontal ring-wheel reactor type, at 2 mbar and 280° C., the polycondensation is completed. The melt is continuously removed from the final reactor and granulated. The product has an intrinsic viscosity of 0.68 dl/g, a carboxyl terminal group content of 16 mmol/kg and a colour value of b=−0.5.

4. EXAMPLE 4

1120 g (6.75 mol) of terephthalic acid are mixed with 523 g (8.4 mol) of ehtylene glycol to form a paste. After the addition of 66 mg titanium tetrabutylate, dissolved in 11 g ethylene glycol, the paste is added under normal pressure at 250° C. to a melt of 600 g of an esterification product from an earlier procedure. The melt is located in an autoclave heated via a double jacket by a liquid heat-carrier. The addition of the paste is effected sufficiently slowly for the heating to maintain a constant temperature in the melt.

The reaction water is distilled off via a separating column. After termination of the addition of paste, the temperature is gradually increased to 270° C. After 163 minutes the theoretical quantity of water of 243 g is distilled off. In a comparative procedure without the addition of titanium tetrabutylate, the esterification is only completed after 220 minutes.

After termination of esterification, 288 g of trisnonylphenylphosphite are added. With a slow application of vacuum, precondensation is started. When a pressure of 20 mbar is achieved, 156 mg cobalt acetate-tetrahydrate, dissolved in 25 g ethylene glycol, is added to the precondensate melt and mixed, and the polycondensation is continued for 100 minutes to a final vacuum of 2.7 mbar. The brightly coloured polyester has an IV of 0.675 and a carboxyl terminal group content of 17.9 mmol/kg.

5. EXAMPLE 5

An esterification product is produced as in Example 4, the esterification product presented being melted down with the addition of 288 mg (0.418 mmol) of trisnonylphenylphospite and mixed with the paste, which contains 66 mg (0.2 mmol) of titanium tetrabutylate. After 160 minutes the esterification is complete and 156 mg (0.63 mmol) of cobalt acetate tetrahydrate is added as a glycolic solution. After a polycondensation time of 110 minutes, a brightly-coloured polyester is obtained with an IV of 0.683 dl/g and a carboxyl terminal group content of 16.5 mmol/kg.

We claim:

1. A method of manufacturing high-molecular polyethyleneterephthalate (PET) or copolyesters thereof, comprising:
   a) reacting at least one multi-basic carboxylic acid with one or a plurality of multi-functional alcohols to form a low-molecular precondensate up to a conversion of at least 85%, measured by the degree of dehydration, using a titanium compound as a catalyst, the titanium compound being present in a concentration of 0.005 to 0.05 mmol titanium per mol of the at least one carboxylic acid; and effecting
   b) polycondensation of the low-molecular precondensate in the presence of the titanium compound to form high-molecular PET or copolyesters thereof, a cobalt-containing compound being added in a concentration of 0.02 to 0.2 mmol cobalt per mol of the at least one carboxylic acids;

phosphorus-containing inhibitor being added in a concentration of 0.004 to 0.4 mmol phosphorus per mol of the at least one carboxylic acid, the phosphorus-containing inhibitor being added before or simultaneously with the cobalt-containing compound.

2. The method according to claim 1, wherein the concentration of the titanium compound comes to 0.01 to 0.03 mmol titanium per mol of polycarboxylic acid.

3. The method according to claim 1, wherein the concentration of the phosphorus-containing inhibitor comes to 0.01 to 0.3 mol phosphorus per mol of polycarboxylic acid.

4. The method according to claim 1, the conversion in step a) is carried out up to a conversion rate of 95%.

5. The method according to claim 1, wherein the phosphorus-containing inhibitor is added together with the titanium compound in step a), and the cobalt compound is added in step b).

6. A high-molecular polyester produced in accordance with the method according to claim 1, wherein the high-molecular polyester contains less than 12 ppm of catalytically active titanium and phosphorus-containing inhibitor and cobalt compound, the molar ratio of cobalt to phosphorus being between 0.5 and 5.0.

7. A high-molecular polyester produced in accordance with the method according to claim 1, wherein the high-molecular polyester contains less than 12 ppm of catalytically active titanium and phosphorus-containing inhibitor and cobalt compound, the molar ratio of cobalt to phosphorus being between 0.7 and 2.0.

8. The method according to claim 7, wherein the at least one carboxylic acid is chosen from terephthalic acid or alkyl esters of terephthalic acid.

9. The method according to claim 7, wherein the multi-functional alcohol is ethylene glycol.

10. The method according to claim 8, wherein the multi-functional alcohol is ethylene glycol.

11. The method according to claim 8, wherein the concentration of the titanium catalyst comes to 0.01 to 0.03 mmol titanium per mol of the at least one carboxylic acid.

12. The method according to claim 3, wherein the concentration of the titanium catalyst comes to 0.01 to 0.03 mmol titanium per mol of the at least one carboxylic acid.

13. The method according to claim 4, wherein the concentration of the phosphorus-containing inhibitor comes to 0.01 to 0.3 mmol phosphorus per mol of the at least one carboxylic acid.

14. The method according to claim 5, wherein the concentration of the phosphorus-containing inhibitor comes to 0.01 to 0.3 mmol phosphorus per mol of the at least one carboxylic acid.

15. The method according to claim 5, wherein the conversion in step a) is carried out up to a conversion rate of 95%.

16. The method according to claim 7, wherein the high-molecular polyester contains less than 12 ppm of catalytically active titanium and phosphorus-containing inhibitor and cobalt compound.

17. The method according to claim 16, wherein in the high-molecular polyester a molar ratio of cobalt to phosphorus ranges between 0.5 to 5.0.

18. The method according to claim 16, wherein in the high-molecular polyester a molar ratio of cobalt to phosphorus ranges between 0.5 to 1.0.

19. The method according to claim 16, wherein in the high-molecular polyester a molar ratio of cobalt to phosphorus ranges between 0.7 to 2.0.

20. The high-molecular polyester according to claim 6, wherein the high-molecular polyester contains less than 12 ppm of catalytically active titanium and phosphorus-containing inhibitor and cobalt compound.

21. The high-molecular polyester according to claim 19, wherein a molar ratio of cobalt to phosphorus ranges between 0.5 to 5.0.

22. The high-molecular polyester according to claim 19, wherein a molar ratio of cobalt to phosphorus ranges between 0.5 to 1.0.

23. The high-molecular polyester according to claim 19, wherein a molar ratio of cobalt to phosphorus ranges between 0.7 to 2.0.

* * * * *